United States Patent [19]

Jones et al.

[11] 4,099,866

[45] Jul. 11, 1978

[54] FOCAL ADJUSTMENT ON A SINGLE-FOCUS LENS IN A CONTINUOUSLY VARIABLE MAGNIFICATION SYSTEM

[75] Inventors: Rick Owen Jones, Longmont; Michael Henry Ulrich, Boulder, both of Colo.

[73] Assignee: International Business Machines Corporation, Armonk, N.Y.

[21] Appl. No.: 748,810

[22] Filed: Dec. 8, 1976

[51] Int. Cl.[2] .............................................. G03B 27/36

[52] U.S. Cl. ...................................................... 355/58

[58] Field of Search ........................ 355/11, 56, 57, 58, 355/55

[56] References Cited

U.S. PATENT DOCUMENTS 3,625,607 12/1971 Bravenec .............................. 355/56

3,778,147 12/1973 Reehil et al. ...................... 355/57 X 3,873,189 3/1975 Whitaker et al. .................. 355/55 X

FOREIGN PATENT DOCUMENTS 568,274 3/1945 United Kingdom ................... 355/55

*Primary Examiner*—Donald A. Griffin

*Attorney, Agent, or Firm*—Charles E. Rohrer

[57] ABSTRACT

Method and apparatus for adjusting the position of a single-focus lens at two positions in a continuously variable reduction document copier machine. Adjustment is made at a 1:1 ratio by shifting the position of the lens on its carriage and adjusting the position of optical path mirrors until focus is obtained. Adjustment is made at a nominal 0.647 reduction ratio by adjusting the position of the lens carriage until focus is obtained. Apparatus is disclosed which provides the second adjustment without affecting the position of the lens at the first adjustment position.

4 Claims, 6 Drawing Figures

$TCL = S' - S$ $\frac{1}{S'} = \frac{1}{f} + \frac{1}{S}$ $m = S'/S$ $D_C = f\left[-m - \frac{1}{m} - 2\right]$ $D_L = f\left[1 + m\right]$ $S_R = S + D_C + D_L$ $S'_R = TCL_R + S_R$ (ACTUAL)

$TCL_R = TCL + D_C$ $S'_R = f \times S_R / (S_R + f)$ (DESIRED)

SIGN CONVENTION:

(−) $m, S, S_R$ (+) $S', S'_R, f$

FOCAL ADJUSTMENT ON A SINGLE-FOCUS LENS IN A CONTINUOUSLY VARIABLE MAGNIFICATION SYSTEM

This invention relates to continuously variable magnification systems, and more particularly to maintaining acceptable focus when utilizing a single-focus lens in such a system. Related patent applications include U.S. patent application Ser. No. 721,124; filed Sept. 7, 1976, incorporated herein by reference; and U.S. patent application Ser. No. 721,125; filed Sept. 7, 1976.

BACKGROUND OF THE INVENTION

Continuously variable magnification (reduction) systems find important application in photocopying systems such as those discussed in the above-mentioned patent applications. Since cost is an everpresent factor in such systems, it is more desirable to use a single-focus lens than a variable-focus lens if possible. Also, for cost reasons, it is desirable to use single-focus lens with maximum acceptable tolerances on the total conjugate length (TCL). As the tolerance is lessened, the expense of the lens is considerably increased. Therefore, in order to realize the economies of utilizing a single-focus lens over a variable-focus lens, it is necessary to provide a system in which the loss of focus due to lens tolerance is kept to acceptable levels while still using a relatively high tolerance lens.

For a continuously variable reduction system used in an electrophotographic copier machine such as described in the above-referenced patent applications, it has been found that when a single-focus lens is adjusted to provide an in-focus condition at a 1:1 copying ratio, the focus error becomes unacceptably large as the reduction ratio is increased for lenses at tolerance limits of, for example, ± 1%. It has been found that for a machine designed to produce a 0.647 reduction ratio, it is necessary to go to a ± 0.5% tolerance lens in order to provide acceptable focus error. In this example, tolerance is measured on total conjugate length (TCL). Such a lens increases the cost of the copy machine considerably.

In a system in which a single-focus lens is cam driven to the desired reduction ratio, one solution is to provide a customized cam for each lens; obviously, such a solution is expensive. An alternative solution is to require, for example, 3 cams — one set of cams for a lens within a certain specification tolerance range, a second set of cams for a second range of tolerances, and a third set of cams for the final range of tolerances. This solution requires the checking of every lens to place the lens within a specific tolerance range and multiplies the inventory on parts. Consequently, this solution is also expensive and less reliable since it is subject to manufacturing error. It is, therefore, the primary object of this invention to provide a method of adjustment and a simple, inexpensive apparatus to retain the economic plus of a single-focus lens system while maintaining acceptable focus and magnification tolerance in a continuously variable reduction system.

SUMMARY OF THE INVENTION

The invention herein calls for a method and a mechanism for adjusting the focus error to an in-focus condition at two positions, where the adjustment at the second position does not affect the adjustment at the first position. By trying down the focal adjustment to a zero error condition at two points, the error condition between the two points, due to lens tolerance, is kept within acceptable limits. The practice of this invention involves the adjustment of lens position at the second position to gain acceptable focus error, and in so doing, involves the sacrifice of magnification preciseness. However, the change in magnification preciseness is found to be very minor.

The preferred embodiment for a mechanism to perform in accordance with this invention involves a cam-driven lens wherein the cam follower is located on a pivoted arm at one end thereof. At the other end of the arm, contact is made with a pin mounted on the lens carriage to provide movement of the lens carriage under the influence of the cam. Specific to this embodiment, a slot is provided on the lens carriage for adjustably locating the pin thereon. At one of the adjusting magnification ratios, the centerline of the arm and slot are maintained in a parallel relationship, perpendicular to the centerline of the lens, such that adjustment of the pin in the slot results in no movement of the lens carriage and therefore has no effect on the focus of the lens. At this position, the lens is adjusted, e.g., by physical movement of the lens on the carriage and optical path mirrors are adjusted, until proper focus is obtained. At the second adjusting position, on the other hand, the arm and the slot are no longer in a parallel relationship, and therefore adjustment of the pin in the slot causes a differing relationship of the pin with respect to the pivot about which the arm is rotated, resulting in movement of the lens carriage. In that manner, an adjustment of the position of the lens is made possible at the second adjustment position without affecting lens adjustment at the first adjustment position.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION

Figure 1:
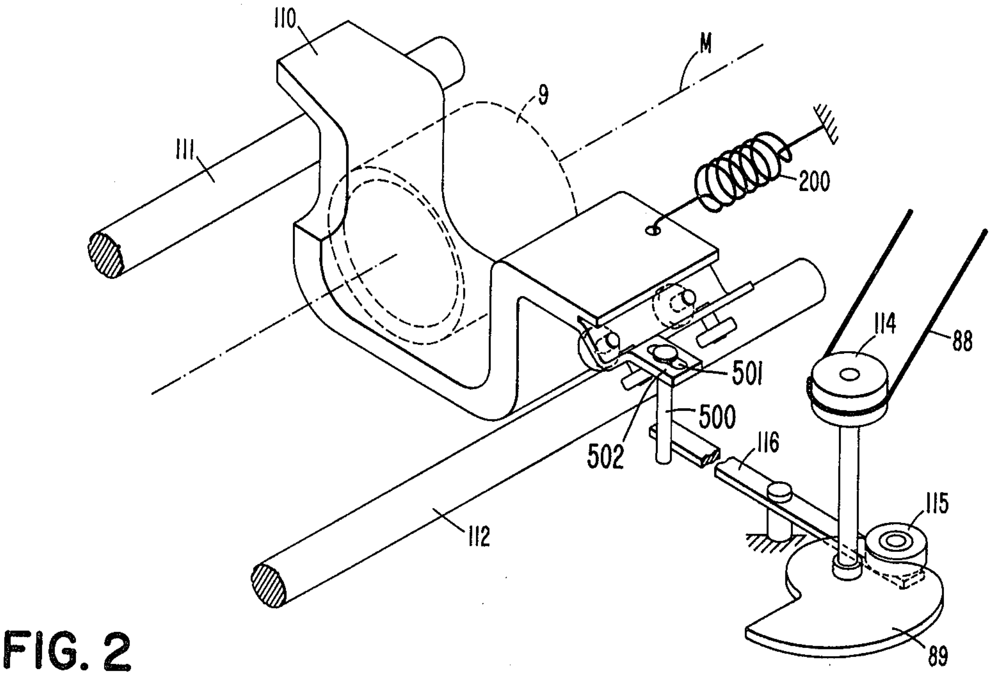
FIG. 1 shows a diagrammatic perspective view of the lens carriage mounted on rails for movement thereon under the influence of a cam and pivoted arm arrangement.

FIG. 1, which corresponds to FIG. 10 of the patent application incorporated by reference, shows a lens carriage 110 into which a lens 9 is placed. Rails 111 and 112, upon which lens carriage 110 rides, are located parallel to the magnification axis M of the lens 9. Lens carriage 110 is moved along rails 111 and 112 in a continuously variable manner under the influence of cam 89 which is driven through a drive cable 88 and pulley 114 from a lens-positioning drive source (not shown). Magnification-adjusting cam 89 coacts with cam follower 115 which is mounted on the end of pivoted drive arm 116 to move the carriage 110 along the rails. Pin 500, attached to lens carriage 110, bears against drive arm 116 through the action of the bias spring 200. In that manner cam follower 115 is also biased against the magnification cam 89.

Figure 2:
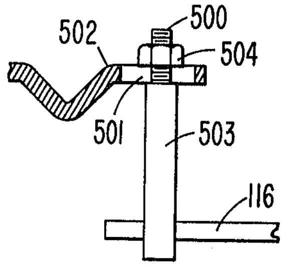
FIG. 2 shows a planar view of the pin fastened to the lens carriage.

Note that pin 500 is fastened within slot 501 located in bracket 502 which is attached to carriage 110. Referring to FIG. 2, it may be seen that pin 500 comprises a threaded bolt which is attached to bracket 502 by nut 504. Pin head 503 provides contact with drive arm 116.

Figure 3:
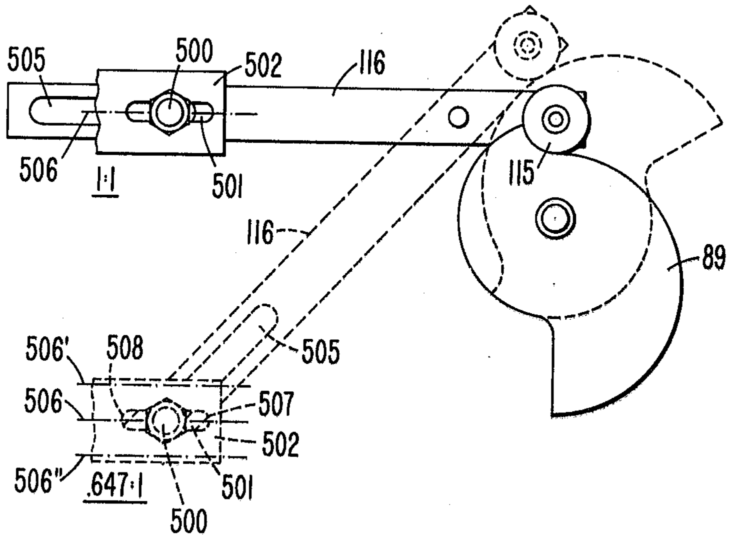
FIG. 3 shows a top view of the pin and the drive arm in both the 1:1 and maximum reduction positions.

FIG. 3 shows the position of the cam 89, cam follower 115, drive arm 116, and pin 500 at the two adjusting positions, selected for illustration to be at 1:1 and 0.647 magnification ratios, the two extreme settings in a typical embodiment. While other magnification ratios could have been selected, the positions of least and most magnification are used here and most practical configurations would probably also use the two extreme positions. Note that at the 1:1 position, adjustment of pin 500 in slot 501 results in a motion of the pin which is parallel to drive arm 116. Consequently, there is no motion of carriage 110 as pin 500 slides back and forth in slot 501. Observe that centerline 506 of slot 501 is parallel to the centerline of drive arm 116.

At the 0.647 position, however, centerline 506 is no longer parallel to drive arm 116. Consequently, if pin 500 is moved to edge 507 of slot 501, drive carriage 110 is moved along rails 111 and 112 until the centerline reaches the position shown as 506'. If pin 500 is moved against edge 508 of slot 501, drive carriage 110 will be moved along rails 111 and 112 until the centerline of slot 501 corresponds to 506". In that manner, the position of the lens may be adjusted at the 0.647 position in order to provide a focus adjustment to the image. It may be observed that after making the adjustment at the 0.647 position, the return of the mechanism to the 1:1 position does not result in any change of lens position relative to the image plane thereat.

Note that in FIG. 3 a slot 505 has been provided in drive arm 116 for surrounding the pin head 503. Such a slot is merely an alternative arrangement to that shown in FIGS. 1 and 2 where only a bearing surface on arm 116 was brought against head 103.

Theory

Figure 4:
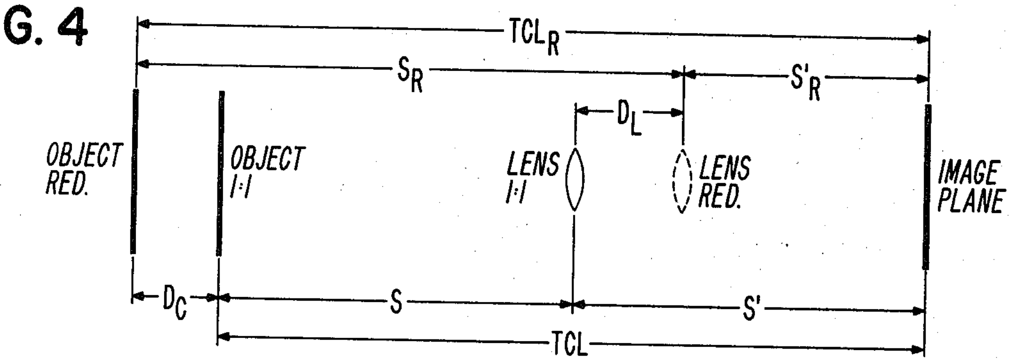
FIG. 4 shows the definition of terms and formulae for thin lens calculation.

The device of the instant invention can be analyzed utilizing thin lens theory and ignoring the thickness of the document glass present in an actual system. Refer to FIG. 4 for formulae and definitions. Suppose that the system uses a 33-inch TCL thin lens. With this lens, it is necessary to move from the 1:1 position toward the image a distance of 2.91 inches in order to achieve a magnification ratio of 0.647. At the same time, an adjustment must be made to the TCL to increase the distance between object plane and image plane by 1.59 inches to keep the image in focus. In a system incorporating the invention, cams are provided to move the lens the required amount and make the necessary TCL adjustments, not only at 0.647 magnification, but also to keep these parameters in adjustment throughout the range of lens movement. The problem which is solved in the instant invention is to provide for a lens TCL which varies $\pm$ 1% while retaining the use of the nominal-size cams.

Consider the case where a +1% variation in lens tolerance (nominal = 33 inches) results in the use of a lens of 33.33 inches TCL. Since the TCL is larger than nominal, the lens position must be adjusted at the 1:1 position to provide a lens to image plane distance of 16.665 inches. To provide 1:1, optical path mirrors must be adjusted to provide that same distance from the lens to the object plane. Note that these distances compare to 16.5 inches for a nominal lens. Continuing to use the cams which were generated for the nominal lens and providing movement to the 0.647 position, it is found that the distance from the lens to the object plane becomes 21.166 inches and the distance from the lens to the image plane becomes 13.753 inches. The actual magnification is found to be in error since 13.753/21.166 = 0.649 instead of 0.647. However, since the focal length, $f = 33.33/4 = 8.33$ inches is known, the desired image distance for peak focus can be calculated to equal 13.743 inches. As a consequence, the desired image distance for peak focus differs from the actual image distance by 0.01 inches. In other words, using a +1% TCL lens, a nominal cam causes a 0.01-inch loss in depth of focus at the nominal 0.647 magnification position. While this depth of focus loss is greater at the maximum reduction, it also occurs at all other intermediate magnifications. Similar results are obtained when the procedure is repeated for a −1% TCL lens.

A focus error of 0.01 inches, caused by +1% TCL variation, is quite serious, since it contributes to a total depth of focus loss in the system. It should be remembered that the position and thickness of the document glass, the position of the image plane, the location of the rails, the positioning of the lens, and the generation and positioning of the cams also must have tolerances and consequently a focus error of this size is unacceptable. In order to correct the focus error to zero and maintain a 0.647 magnification, the distance from the object plane to the lens would have to be adjusted, as well as the magnification cam. The instant invention regards this as overly complicated and unnecessary and finds it necessary merely to correct the focus error by adjusting the lens position. As a result, the focal adjustment is made and the magnification is allowed to change.

Considering the same +1% TCL lens again, it is found that the lens must move toward the image plane by 0.0177 inches. Thus, for a thin lens, the focus error caused by +1% TCL variation can be corrected by adjusting the lens position that amount. The resulting magnification after this adjustment is 0.648; similar calculations for the −1% TCL lens show that the lens position changes by 0.017 inches and the magnification becomes 0.6456.

Figure 5:
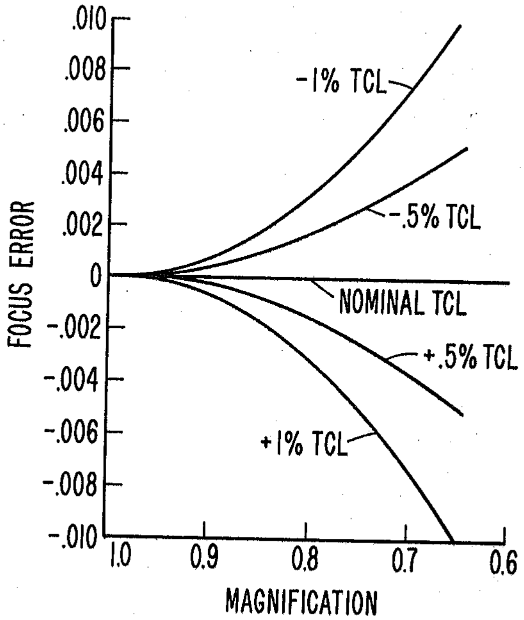
FIG. 5 is a graph of the focus error against the magnification for an uncompensated lens.

FIG. 5 shows a graph of focus error against magnification setting as a result of TCL variation in the lens. It graphically shows that as the magnification (reduction) is increased from 1:1, the focus error increases at an increasing rate.

Figure 6:
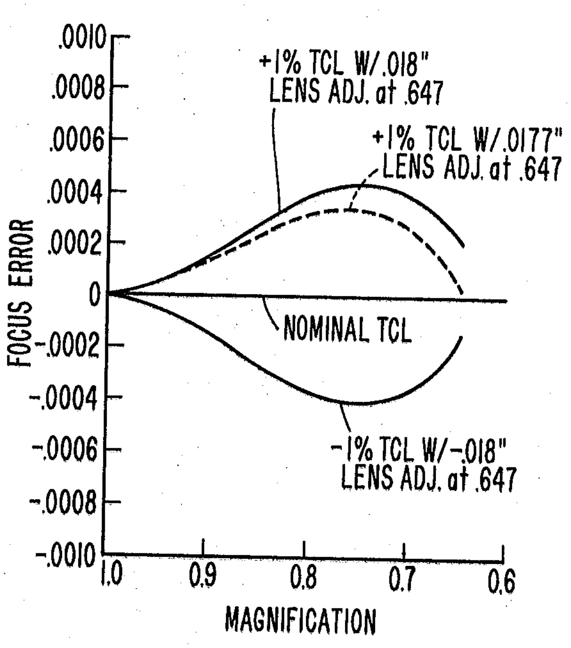
FIG. 6 is a graph of focus error versus magnification, where the lens position is adjusted according to the instant invention.

FIG. 6 shows the result of the use of this invention where the focus error at 0.647 magnification is pinned to zero. As a consequence, the error between the 1:1 and 0.647 positions always remain within acceptable limits.

Other mechanical arrangements can be visualized for performing the method of the instant invention. For example, instead of including a slot on the bracket of the lens carriage, a slot could be used around the pivot point and the position of the pivot varied. In such an arragement further provision would be needed for assuring that the cam follower always retained its correct position on the surface of the cam. Thus, it too would be placed in a slot. Another arrangement which could be used for performing the instant invention would be in providing a variable rise cam wherein the position of the cam could be adjusted and thus the position of the lens carriage at the 0.647 position.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a continuously variable reduction optical system for use in a document copier machine, said system including a lens, apparatus comprising:

a lens carriage upon which said lens is mounted;

guideways mounted in said machine for supporting said lens carriage and providing a guideway for lens movement;

an optics positioning system for positioning said lens carriage along said guideways to continuously variable positions;

adjusting means mounted on said lens carriage for adjusting the position of said lens carriage at a selected magnification ratio for providing substantially zero focus error at said ratio; and drive means coacting with said adjusting means to impart motion to said carriage, said drive means and said adjusting means geometrically aligned such that movement of said adjusting means to provide substantially zero focus error at said selected magnification ratio results in no change in adjustment of said lens carriage at a particular magnification ratio substantially distant from said selected magnification ratio.

2. The apparatus of claim 1 wherein said drive means includes a drive arm and said adjusting means includes a slot rigidly affixed to said lens carriage, and wherein the centerline of said slot is parallel to the centerline of said drive arm at said particular magnification ratio, and both are perpendicular to the centerline of the lens.

3. In a continuously variable reduction optical system wherein both the object and image planes are stationary, wherein a single focus lens is mounted on a lens carriage for movement to an infinite number of reduction positions between boundaries, wherein the lens is allowed a tolerance range relative to total conjugate length, and wherein the total conjugate length and the reduction ratio of the optical system are set by moving optical path mirrors and the lens according to lens nominal values, a method of minimizing the focus error due to lens tolerance comprising the steps of:

at a first reduction ratio, adjusting the position of the lens and mirrors to achieve substantially zero focus error while maintaining the precise reduction ratio; and at a second reduction ratio substantially distant from said first reduction ratio, adjusting the position of the lens carriage to achieve substantially zero focus error without affecting the adjustment of lens position at said first reduction ratio when said lens is returned to the first reduction ratio.

4. The method of claim 3 wherein said first reduction ratio is at an extreme magnifying position and said second reduction ratio is at an extreme reduction position.

* * * * *